United States Patent
Evarts

(10) Patent No.: US 7,704,017 B2
(45) Date of Patent: Apr. 27, 2010

(54) FRICTION SHAFT COUPLING WITH PERPENDICULAR ADJUSTMENT

(75) Inventor: Kingsley S. Evarts, Montgomery, TX (US)

(73) Assignee: Pileco Inc., Houston, TX (US)

( * ) Notice: Subject to any disclaimer, the term of this patent is extended or adjusted under 35 U.S.C. 154(b) by 85 days.

(21) Appl. No.: 12/150,716

(22) Filed: Apr. 30, 2008

(65) Prior Publication Data

US 2009/0272617 A1 Nov. 5, 2009

(51) Int. Cl.
*E02D 7/18* (2006.01)
(52) U.S. Cl. ........................................ 405/232; 173/49
(58) Field of Classification Search ................ 405/232; 173/49; 74/61
See application file for complete search history.

(56) References Cited

U.S. PATENT DOCUMENTS

| | | | | |
|---|---|---|---|---|
| 2,350,921 A * | 6/1944 | Pinazza | ........................ | 173/49 |
| 3,280,924 A * | 10/1966 | Pavlovich | ..................... | 173/49 |
| 3,419,313 A * | 12/1968 | Ulusal | .......................... | 173/49 |
| 3,433,311 A * | 3/1969 | Lebelle | ......................... | 173/49 |
| 4,113,034 A * | 9/1978 | Carlson | ........................ | 173/49 |
| 4,625,811 A * | 12/1986 | Tuenkers | ..................... | 173/49 |
| 4,793,196 A * | 12/1988 | Davis et al. | ..................... | 74/61 |
| 4,819,740 A * | 4/1989 | Warrington | ................... | 173/49 |
| 5,088,565 A | 2/1992 | Evarts | | |
| 5,355,964 A * | 10/1994 | White | ......................... | 405/232 |
| 5,474,138 A | 12/1995 | Evarts | | |
| 5,529,132 A | 6/1996 | Evarts | | |
| 5,725,329 A | 3/1998 | Chelminski | | |
| 5,988,297 A * | 11/1999 | Zimmerman et al. | .......... | 173/49 |
| 6,604,583 B1 * | 8/2003 | Van Randen | .................. | 173/49 |
| 7,168,890 B1 | 1/2007 | Evarts | | |

* cited by examiner

*Primary Examiner*—Frederick L Lagman
(74) *Attorney, Agent, or Firm*—Fletcher Yoder PC

(57) ABSTRACT

There is provided a system and method for coupling with a shaft. In particular, there is provided a friction shaft coupler that includes a center plate and a plurality of outer plates, wherein the outer plates are configured to abut the center plate. The center plate and the plurality of outer plates each include a shaft bore configured to receive a shaft and a plurality of stub bores. The friction shaft coupler also includes a plurality of stubs, wherein each stub is configured to fit inside one of the plurality of stub bores, the plurality of stubs comprising a plurality of apertures that are perpendicular to a longitudinal axis of the stubs. Additionally, the friction shaft coupler includes a plurality of set screws configured to fit inside the apertures of the stubs, wherein the set screws are accessible for adjustment via access holes in the plurality of outer plates.

19 Claims, 10 Drawing Sheets

FRICTION SHAFT COUPLING WITH PERPENDICULAR ADJUSTMENT

BACKGROUND OF THE INVENTION

1. Field of the Invention

The present invention relates generally to shaft couplings and, more particularly, to shaft couplings with adjustment means perpendicular to the shaft.

2. Description of the Related Art

This section is intended to introduce the reader to various aspects of art that may be related to various aspects of the present invention, which are described and/or claimed below. This discussion is believed to be helpful in providing the reader with background information to facilitate a better understanding of the various aspects of the present invention. Accordingly, it should be understood that these statements are to be read in this light, and not as admissions of prior art.

Shafts are used in many different mechanical devices and may be used for different purposes. For example, a drive shaft may be used to transfer torque from a combustion engine to wheels of a vehicle to move the vehicle. Alternatively, a shaft may be used as a support member to hold other members or devices in a particular position and/or, in some instances, may be used as an axis for rotation. In yet other applications, a bearing housing may be attached to the shaft to reduce the amount of friction caused by rotation of a shaft.

Additionally, although shafts may take on several different shapes, one common shape is a cylinder. Many applications that use cylindrical shafts require a component or member to be coupled to the shaft so that it may move in conjunction with the shaft (or vice-versa) and/or so that it does not move longitudinally along the shaft, among other reasons. Several different techniques have been developed to rigidly couple components or members to cylindrical shafts. For example, keys, spines, and flats are common shaft configurations that allow for a rigid coupling with a cylindrical shaft. Generally, keys, spines and flats are non-circular portions of a shaft that corresponds with non-circular portions in a bore of the member that is to be coupled with the shaft. The non-circular portions of the shaft and the member coupled to shaft allow for the member to move in conjunction with the shaft. The resultant fit between the shaft and the bore produces large radial forces applied by the bore of the coupling member normal to the shaft diameter, which locks the coupled member to the shaft.

An alternative technique is an interference fit, wherein the shaft and the bore of the member coupled to the shaft are manufactured to have a very tight tolerance. Stated differently, the bore does not provide much clearance for the shaft. Because of the tight tolerance, the coupling of the member and the shaft requires the application of a high amount of pressure, the temporary expanding of the bore through heating, or a combination of pressure and heat to allow the shaft to fit into the bore.

Another alternative technique for coupling members to a cylindrical shaft is using a split ring and bolt or screw. The split ring fits around the shaft and is clamped down on the shaft by tightening the bolt or screw. Producing a frictional coupling. An alternative technique involves using one or more set screws, or similar threaded devices, within the coupled member which, when tightened, bear directly on the shaft, and produce a frictional or mechanical coupling.

The use of keys, spines, flats, interference fits, and/or split ring couplers have disadvantages, however. First, the use of keys, spines or flats includes modifications to the shaft that may weaken the shaft. Similarly, because the split rings are not unitary members, they may lack structural integrity. Set screws, which bear directly on the shaft, often cause damage to the shaft. It may also be difficult to configure sufficient quantity and screw size to intersect the shaft and generate the desired frictional force. Alternatively, the use of an interference fit may increase the difficulty associated with assembling the shaft and member, as well as complicating the replacement of the member or the shaft.

Embodiments of the present invention may address one or more of the issues mentioned above.

SUMMARY

Certain aspects commensurate in scope with the originally claimed invention are set forth below. It should be understood that these aspects are presented merely to provide the reader with a brief summary of certain forms of the invention might take and that these aspects are not intended to limit the scope of the invention. Indeed, the invention may encompass a variety of aspects that may not be set forth below.

In accordance with one aspect of the present invention, there is provides a friction shaft coupler. The frictional shaft coupler includes a center plate and a plurality of outer plates. The outer plates are configured to abut the center plate and the center plate and the plurality of outer plates each comprise a shaft bore configured to receive a shaft and a plurality of stub bores. The friction shaft coupler also includes a plurality of stubs comprising a plurality of threaded apertures that are perpendicular to a longitudinal axis of the stubs, wherein each stub is configured to fit inside one of the plurality of stub bores. Additionally, the friction shaft coupler includes a plurality of threaded members configured to fit inside the apertures of the stubs, wherein the threaded members are accessible for adjustment via access holes of the plurality of outer plates.

In accordance with another aspect, there is provided a method of manufacturing a shaft coupler. The method includes providing a center plate having a shaft bore and a plurality of stub bores. Stubs are positioned within the plurality of stub bores of the center plate and the stubs include a plurality of threaded apertures perpendicular to the longitudinal axis of the stubs. The method also includes inserting threaded members into the threaded apertures of the stubs and positioning at lest one outer plate on each side of the center plate. Each outer plate comprises a shaft bore, a plurality of stub bores, wherein the plurality of stubs are positioned within the plurality of stub bores of the outer plates, and a plurality of access holes configured to align with the threaded apertures of the stubs to allow access to a the threaded members. The threaded members are tightened within the stubs.

In accordance with yet another aspect of the present invention, there is provided a vibratory hammer system comprising a lifting apparatus. A vibratory hammer apparatus is coupled to the lifting apparatus and configured to be moved by the lifting apparatus. The vibratory hammer apparatus comprises a gear box, a shaft supported by the gear box, and a coupling member assembly coupled to the shaft. The coupling member assembly comprises a plurality of plates which are coupled to the shaft by tightening threaded members oriented perpendicular to a longitudinal axis of the shaft.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A friction shaft coupler is disclosed herein that provides adjustment generally perpendicular to the shaft axis. The friction shaft coupler avoids the above-identified issues present in the split ring, interference fit, key, spine, and flat couplers by maintaining structural integrity and by being easy to assemble and disassemble, particularly when the shaft and coupling member are located in a confined space, such as a gear box.

Generally, friction shaft couplers include a number of screws or bolts radially oriented around a bore on a circular face of a coupling member. The shaft and the bore of the coupling member have a narrow clearance sufficient to allow the shaft to slide into the bore (or the bore to slide over the shaft). The longitudinal axis of the screws are oriented parallel to the shaft and apply longitudinal forces to male and female conical rings as they are tightened in an axial direction relative to the shaft. The tightening of the screws or bolts and conical rings results in radial clamping pressure on the shaft and the coupled member to induce the friction that locks the member and the shaft together. In contrast to conventional friction shaft couplers, the presently presented embodiments allow for perpendicular adjustment, as will be discussed in detail below.

Figure 1:
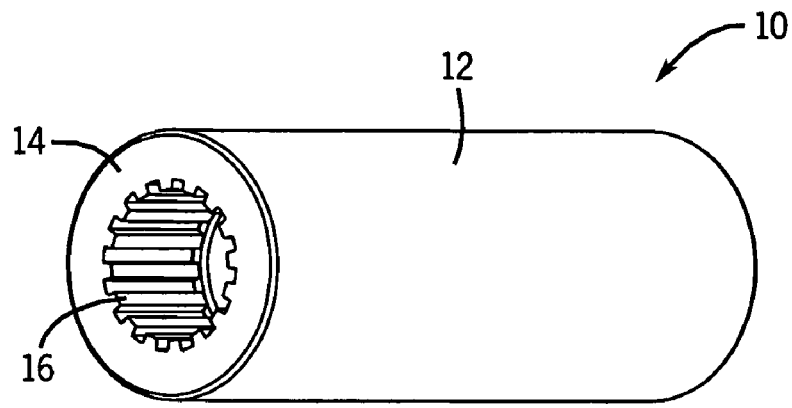
FIG. 1 illustrates a geared shaft, or driven shaft, in accordance with an exemplary embodiment of the present invention.

Turning now to the figures and referring initially to FIG. 1, a geared shaft 10 is illustrated. The geared shaft 10 includes an elongated surface 12 which serves as a coupling surface to the inside of bores of coupling members. Additionally, the geared shaft 10 includes an end 14 that may be configured with teeth 16. The teeth 16 may interlock with gears of a drive shaft (not shown) to rotate the shaft 10. Although the end 14 is illustrated as having teeth 16 for receiving gears, it should be understood that other alternative configurations may be used to allow for torque to be transferred to the shaft 10.

Figure 2:
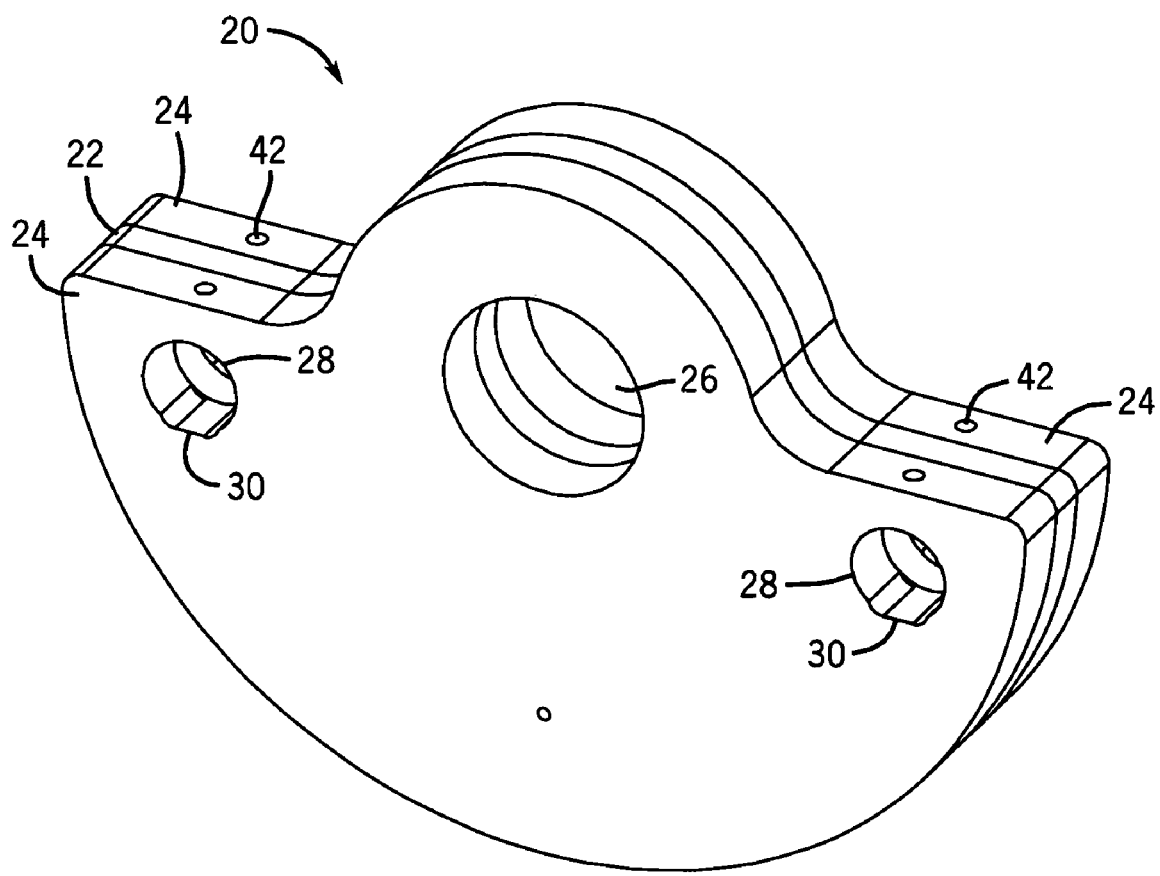
FIG. 2 illustrates coupling member plates arranged to be coupled with the geared shaft of FIG. 1 in accordance with an exemplary embodiment of the present invention.

The shaft 10 may be used in conjunction with coupling member plates 20 illustrated in FIG. 2 in accordance with an exemplary embodiment of the present invention. As illustrated, the coupling member plates may include a center plate 22 and two outer plates 24a-b. In FIG. 2, the coupling member plates 20 are illustrated as having a generally semi-circular shape, to allow for use as eccentric weights in a vibratory hammer. However, it should be understood that the plates 28 may be equally useful in other applications in different shapes, such as a full circle or ellipse, for example. Additionally, the coupling member plates may be made of sheet metal or any other material that provides adequate strength required for particular applications. The thickness of the plates may also be application dependent, as size and weight may be factors for consideration, among others, for a particular application.

Each of the plates 22 and 24a-b have a shaft bore 26 through which the geared shaft 10 may be inserted. The clearance between the shaft 10 and the shaft bore 26 may be narrow, i.e., only a few $\frac{1}{1000}$ of an inch, but sufficient to allow the shaft to be inserted into the bore without excessive pressure and/or heating of the plates 20. The narrow clearance helps facilitate some frictional coupling of the coupling member plates 20 and the shaft 10, and distributes frictional radial load over a shaft area to prevent shaft damage.

As can be seen, the coupling member plates 20 also may include stub bores 28a-c. The stub bores 28a-b of the outer plates 24a-b are generally circular in shape, but may include a flat surface 30 which serves as a pressure point for set screws, as will be described below. The stub bore 28c of the center plate 22, by way of comparison, may be completely round and slightly larger than the stub bores 28a-b of the outer plates 24a-b. This is to prevent the stub 34 from exiting the stub bore 28 when the coupling member assembly is assembled or in a failure event. The flat surface 30 may also be used for aligning the stub 34 within the stub bore 28. In particular, the stub 34 may be configured with a flattened portion (not shown) that corresponds to the flat surface 30 so that the stub 34 will remain properly oriented within the stub bore 28. In an alternative embodiment, the stub bore 28c of the center plate 22 may include a non-circular portion (not shown) to aid in aligning the stub 34 within the stub bore 28.

Figure 3:
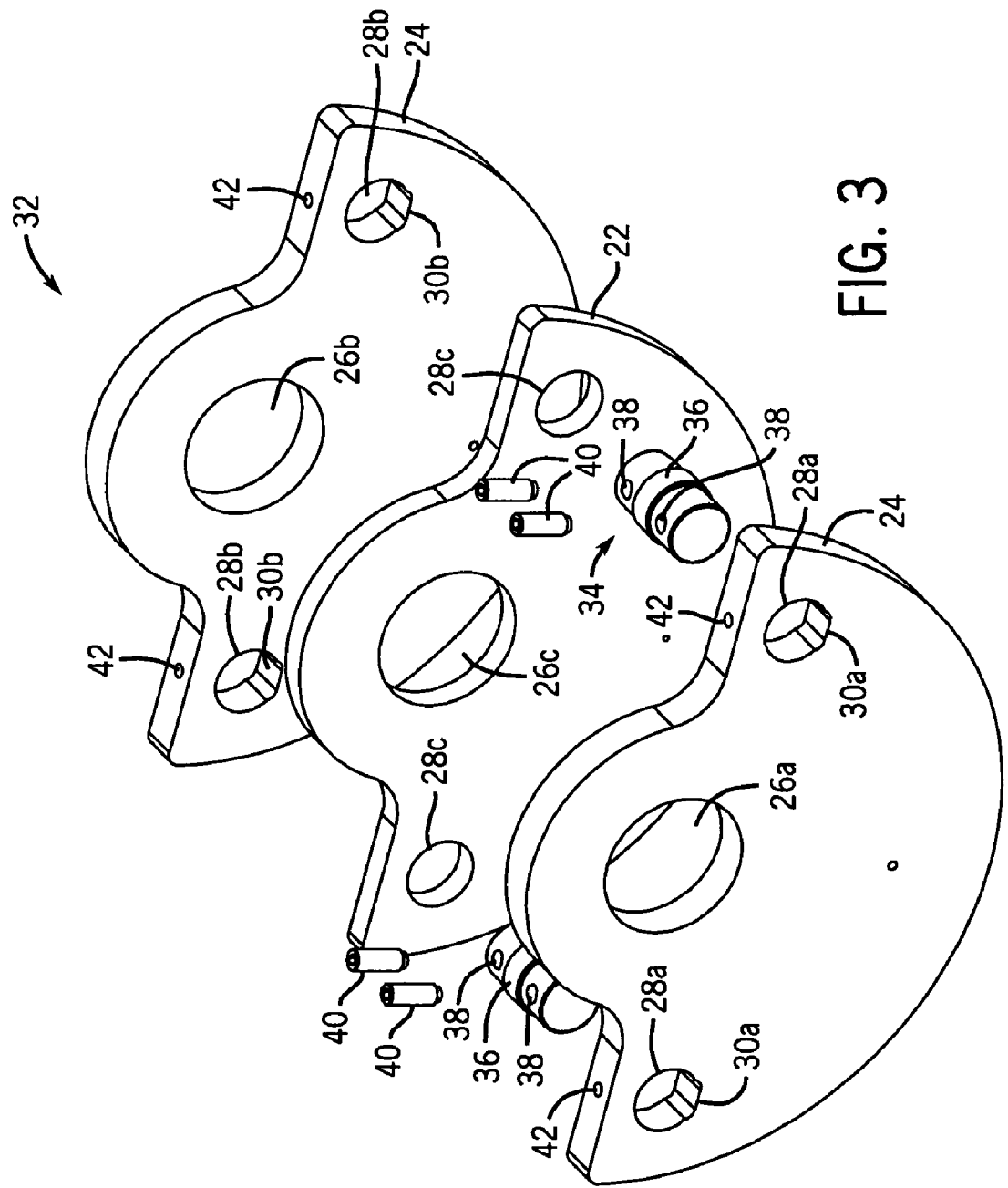
FIG. 3 illustrates a coupling member assembly in accordance with an exemplary embodiment of the present invention.

The flat surface 30 of the outer plates 24 and the stub bore 28 may more easily be seen with reference to FIG. 3 which illustrates a coupling member assembly 32 with the three coupling member plates 20 separated. The coupling member assembly 32 may include a stub 34 which may be inserted into the stub bore 28 of the coupling member plates 20. The stub 34 may be machined to have a band 36 that protrudes from the middle of stub 34. The band 36 allows for a narrow clearance between the stub bore 28c of the center plate 22 and the band 36. As mentioned above, the stub bore 28a-b of the outer plates 24a-b may be smaller than the stub bore 28c of the center plate 22. This effectively prevents the stub 34, with its larger diameter band 36, from exiting the stub bore 28c in the center plate 22 when the center plate 22 and the outer plates 24a-b are assembled together, so that the stub 34 will remain centrally located between the two outer plates 24a-b.

The stub bores 28a-b in the outer plates 24a-b may be significantly larger in diameter than the stub diameters 38, thus allowing for minute radial displacement of the stubs 34 when threaded members, such as set screws 40, for example, or other similar threaded member or screw, are tightened. Specifically, as the set screws 40 are tightened, they push against the flat surface 30 of the stub bores 28a-b causing the stub 34 to move in the opposite direction of the pressure. The stub bores 28a-b of the outer plates 24a-b may be sufficiently larger to allow for such displacement. For example, the stub bores 28a-b may have a diameter $\frac{1}{16}^{th}$ to $\frac{1}{64}^{th}$ of an inch larger than the diameter of the stub 34. As the stub 34 moves relative to the outer plates 34, because of the narrow fit between the band 36 and the stub bore 28c of the center plate 22, the band 36 exerts pressure on the stub bore 28c of the center plate 22, resulting in slight displacement relative to the outer plates 24a-b and friction on a shaft located in the shaft bore 26.

The stub 34 includes apertures 38 which may be threaded to allow for the placement of set screws 40 within the stub 34. The set screws 40 may be mounted within the stub 34 so that they do not protrude beyond the surface of the stub 34 and so that the stub 34 may fit within the stub bore 28. The apertures 38 and the set screws 40 may have a slightly larger diameter than access holes 42 of the outer plates. The access holes 42 may be configured to align with apertures 38 of the stub 34 so that the screws 40 may be accessed, with an appropriate tool, for adjustment of the coupling member assembly 32. As discussed above, the flat portions 30 of the outer plates 24a-b may aid in achieving a proper alignment. The diameter of the access holes 42 may be smaller than the apertures 38 of the stub 34 to prevent the screws 40 from exiting the stub 34.

In many applications, the shaft 10 and the coupling member 20 are configured to rotate together at a high rate and, in some instances, may do so within a confined space, such as a gear box, for example. Due to the high rate of rotation, any loose items, such as a screw for example, are generally undesirable. As such, the screws, and any component part which has potential to come loose, should typically be secured. The smaller diameter of the access holes 42 accomplishes this purpose in the same way that the smaller stub bores 28a-b of the outer plates 24a-b contains the stub 34.

Figure 4:
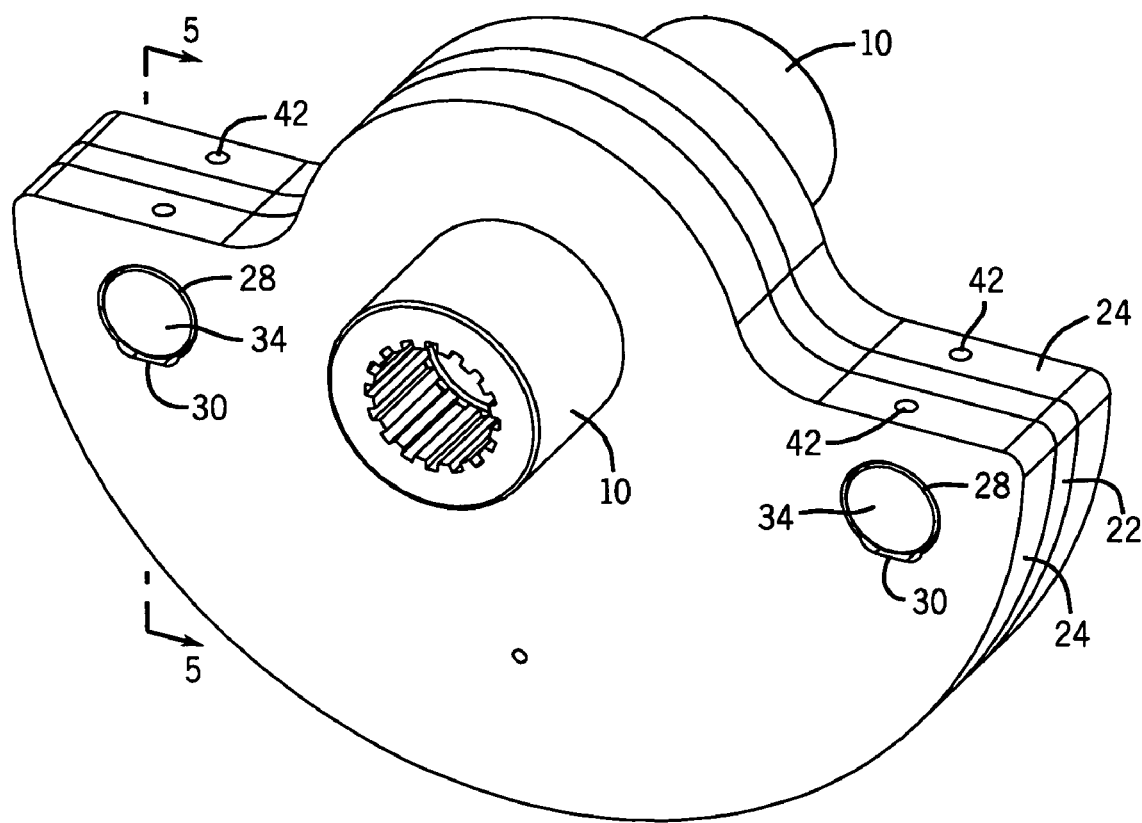
FIG. 4 illustrates an assembled coupling member having a shaft inserted through a shaft bore in accordance with an exemplary embodiment of the present invention.
Figure 5A:
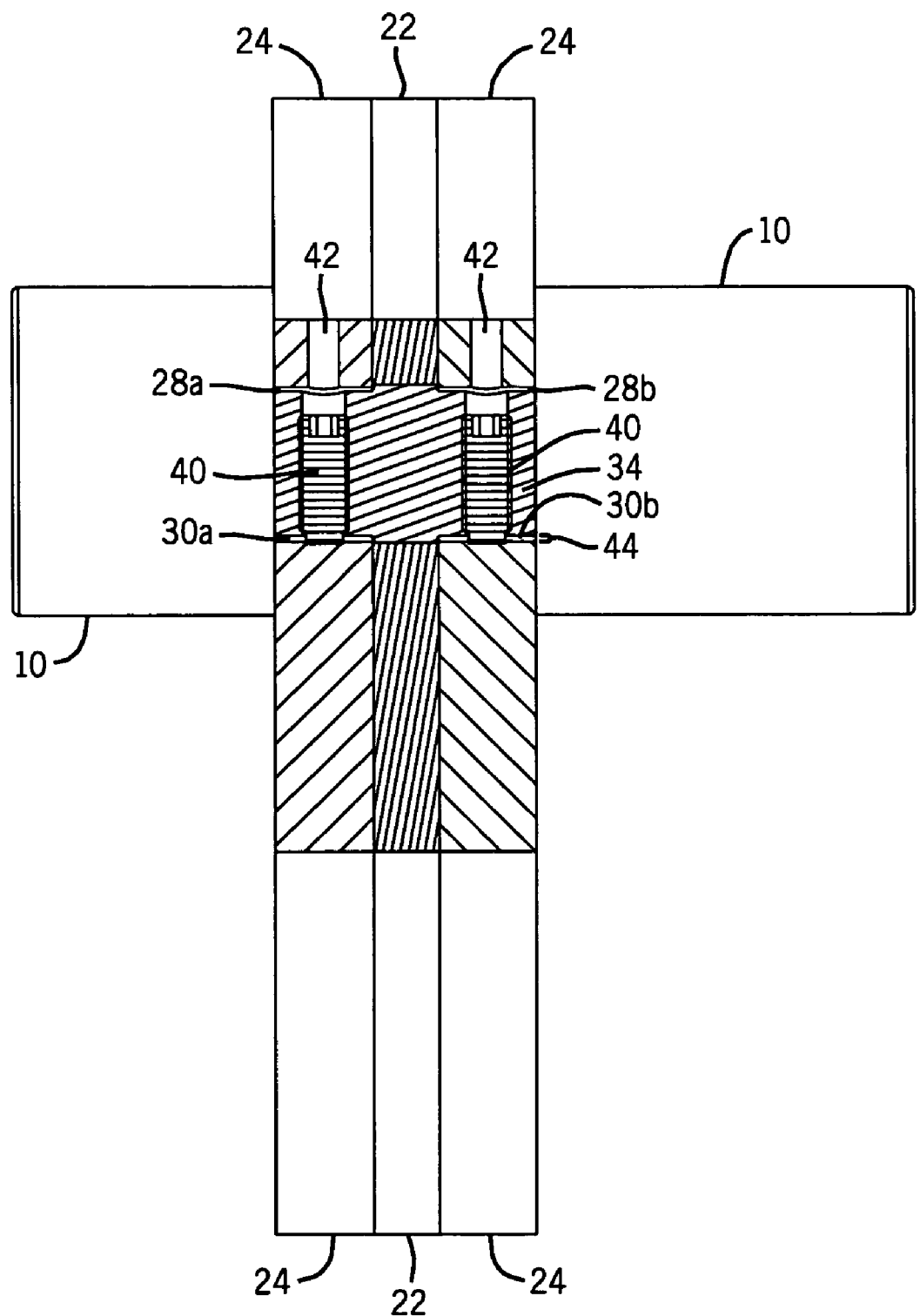
FIG. 5A illustrates a cross-sectional view of the assembled coupling member assembly in the area of the stub in accordance with an exemplary embodiment of the present invention.

A fully assembled coupling member having a shaft 10 inserted into the shaft bore 26 is shown in FIG. 4. A cross-sectional view of the assembled coupling member is illustrated in FIG. 5A. As can be seen, the diameter of the access holes 42 is smaller than the diameter of the apertures 38 to prevent the set screws 40 from exiting the stub 34. The access holes 42 are large enough to allow a tool, such as a hex key or screw driver, for example, to reach the set screws 40 for adjustment. The tightening of the set screws 40 causes the screws 40 to exert pressure on the flat surface 30 of the outer plates 24a-b. As noted above, the diameter of the stub bores 28a-b of the outer plates 24a-b is significantly larger than the diameter of the stubs 34. This allows for the displacement 44 of the stub 34 relative to the outer plates 28 as the set screws 40 are tightened. The pressure exerted by the set screws 40 causes the outer plates 24a-b to move downward relative to the center plate 22 and the shaft 10. Additionally, the downward pressure of the set screw 40 on the outer plates 24a-b results in upward pressure being applied to the center plate 22 by the band 36 of the stub 34. These pressures may be quite high due to the multiplicity of set screws 40 in the coupling. As mentioned above, the clearance between a shaft 10 inserted into the shaft bore 26 of the coupling member plates 20 is very narrow. As such, the pressure applied by the set screws 40 and the relative movement of the coupling member plates 20 creates friction on the shaft 10. The friction is sufficient to rigidly couple the coupling member plates 20 with the shaft 10 so that they will move together.

Figure 5B:
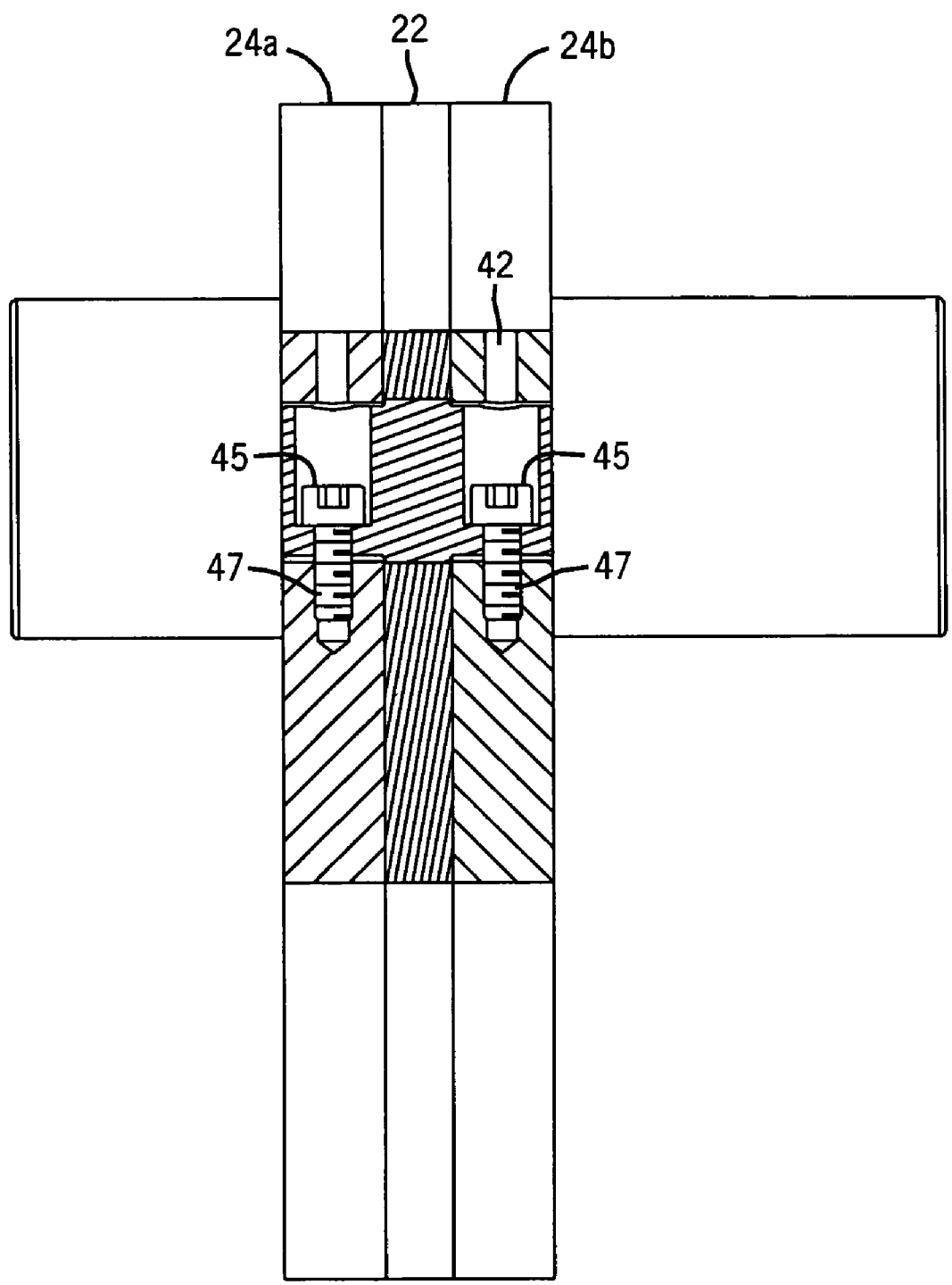
FIG. 5B illustrates a cross-section view of an assembled coupling member assembly in accordance with an alternative embodiment of the present invention.

A cross sectional view of an alternative embodiment using socket head cap screws (SHCS) is illustrated in FIG. 5B. In particular, SHCSs 45 are illustrated in holes 38 of the stubs 34 and also threaded into tapped holes 47 in the outer plates 24a-b, as shown. In this embodiment, the tapped holes 47 replace the flat surface 30. The SCHSs 45 may be accessed through the access holes 42. As the SCHSs 45 are tightened, the outer plates 24a-b are pulled upwards toward the stub 34 causing a downward pressure to be exerted by the stub 34 on the center plate 22.

Figure 5C:
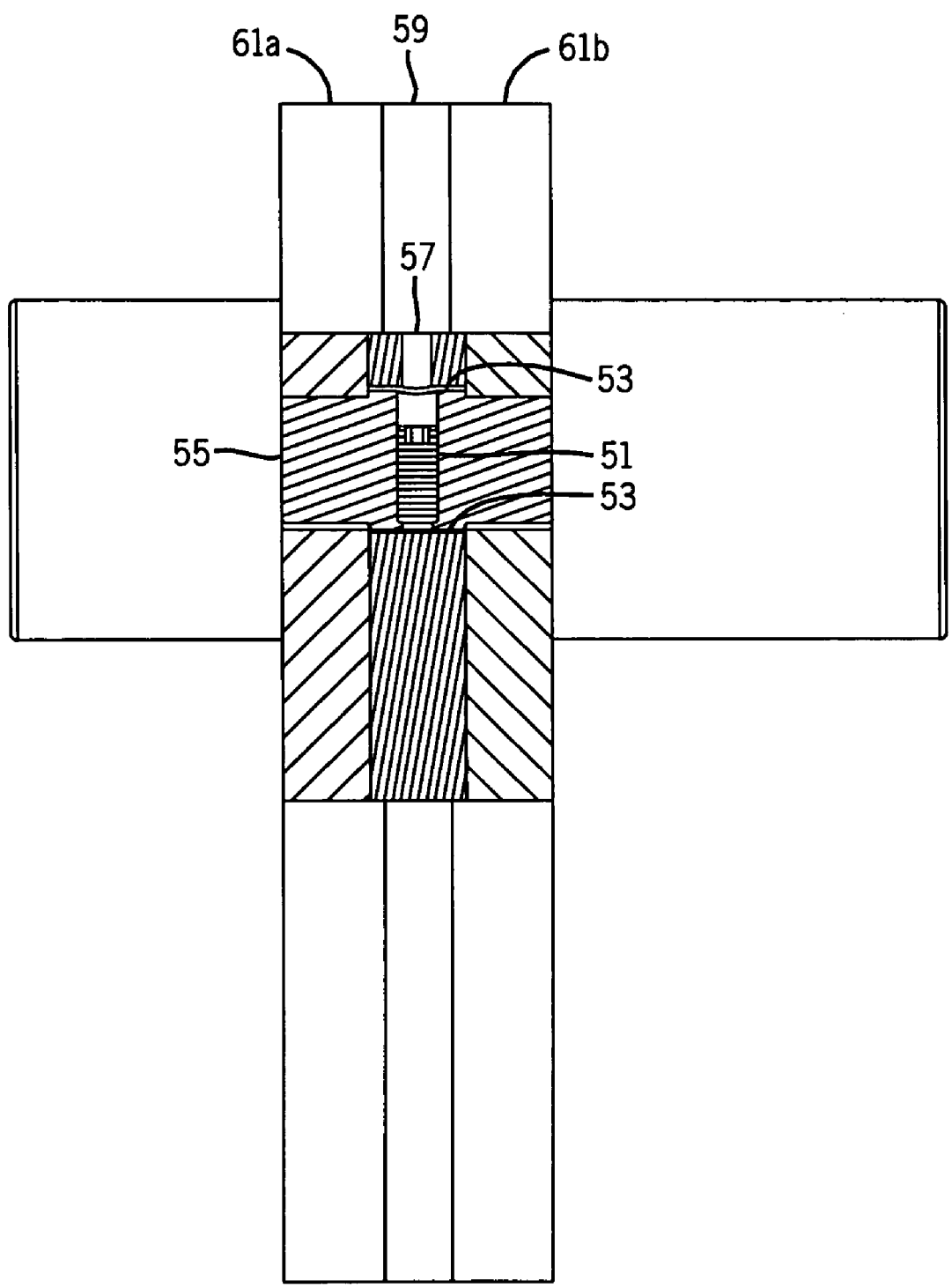
FIG. 5C illustrates a cross-sectional view of an assembled coupling member assembly in accordance with yet another alternative embodiment of the present invention.

Although the previously described embodiments, included two threaded members per stub 34, in yet other embodiments, there a single threaded member may be used. As illustrated in FIG. 5C, a single threaded member 51 is illustrated as being located in a banded portion 53 of a stub 55. The threaded member 51 may be accessed via an access hole 57 in a center plate 59. Outer plates 61a-b do not include access holes, but are configured to have a tight clearance with the stub 55. A stub bore of the center plate 59 would include relatively large clearance about the banded portion 53 of the stub 55 so that the stub 55 may move relative to the center plate 59 as the threaded member is adjusted. Specifically, as the threaded member 51 is tightened, a pressure is exerted downward on the center plate 59 resulting in an upward pressure being exerted on the outer plates 61a-b by the stub 55. As in the other embodiments, the banded portion 53 of the stub 55 is larger than the stub bores of the outer plates 61a-b to prevent axial migration of the stub 55.

Figure 6:
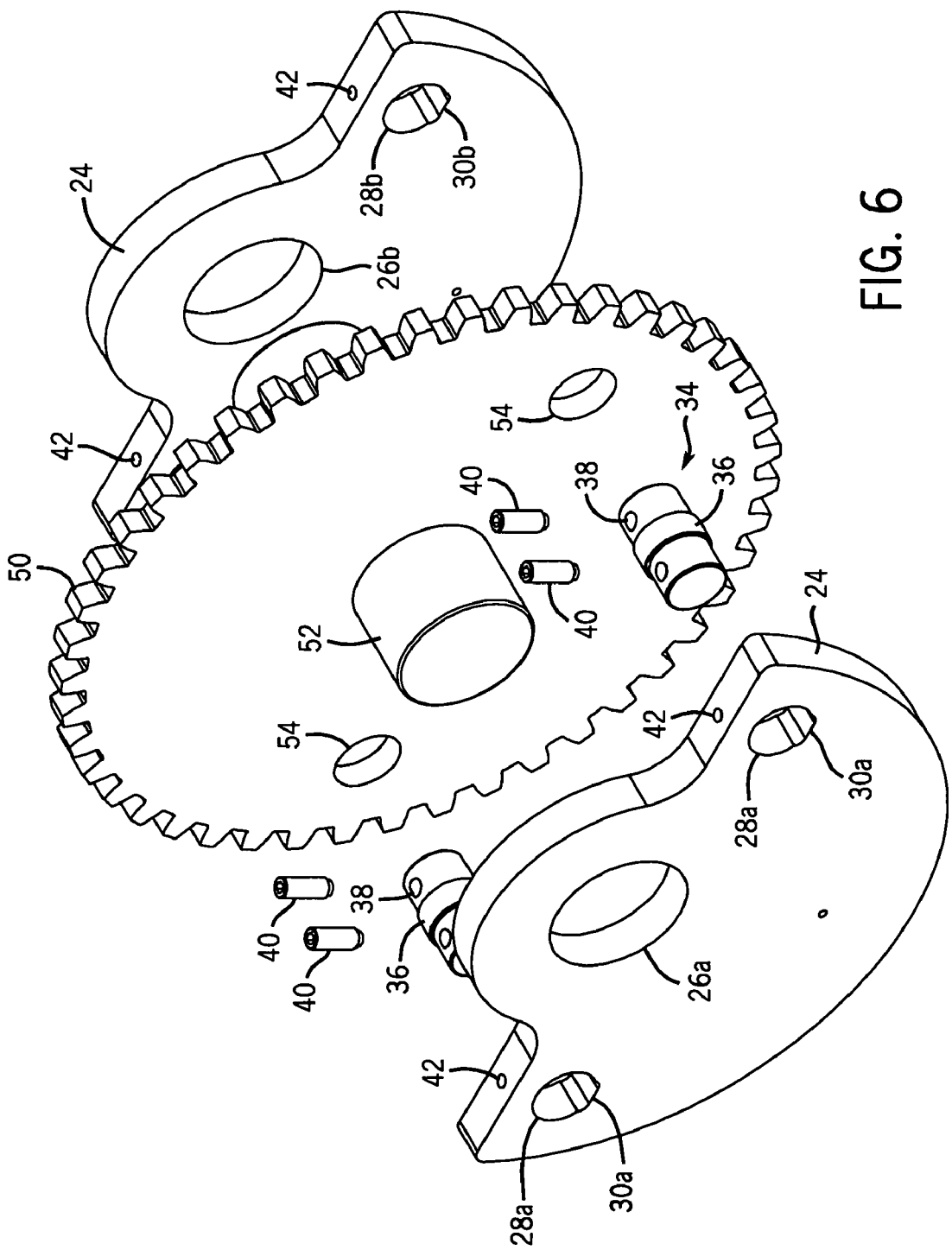
FIG. 6 illustrates an alternative center plate arrangement for the coupling member assembly in accordance with an exemplary embodiment of the present invention.

An alternative embodiment is illustrated in FIG. 6 which shows an alternative coupling member assembly 49 having a geared center plate 50 and a smooth shaft 52. In this embodiment, the center plate 50 may drive the rotation of the coupling member assembly 49 and the shaft 52. Similar to the coupling member assembly 32 illustrated in FIG. 3, the coupling member assembly 49 provides perpendicular adjustment via access holes 42 of the outer plates 24a-b. An additional advantage, as illustrated in this alternative embodiment FIG. 6, is that both the driving member 50 and the driven members (outer plates 24a-b) are coupled to the shaft 52 and form a single coupling assembly. Further, not all of the torque from the driving member 50 need be transferred to the driven members (outer plates 24a-b) through friction with the shaft 52. Some portion of the driving torque may be transferred to the outer plates 24 a-b through the stubs 34. Friction between the shaft bore 26 of the center plate 50 and the shaft 52 insures rotation of the shaft 52 within a bearing housings (not shown) and will prevent axial translation, or movement, of the coupling assembly on shaft 52.

Figure 7:
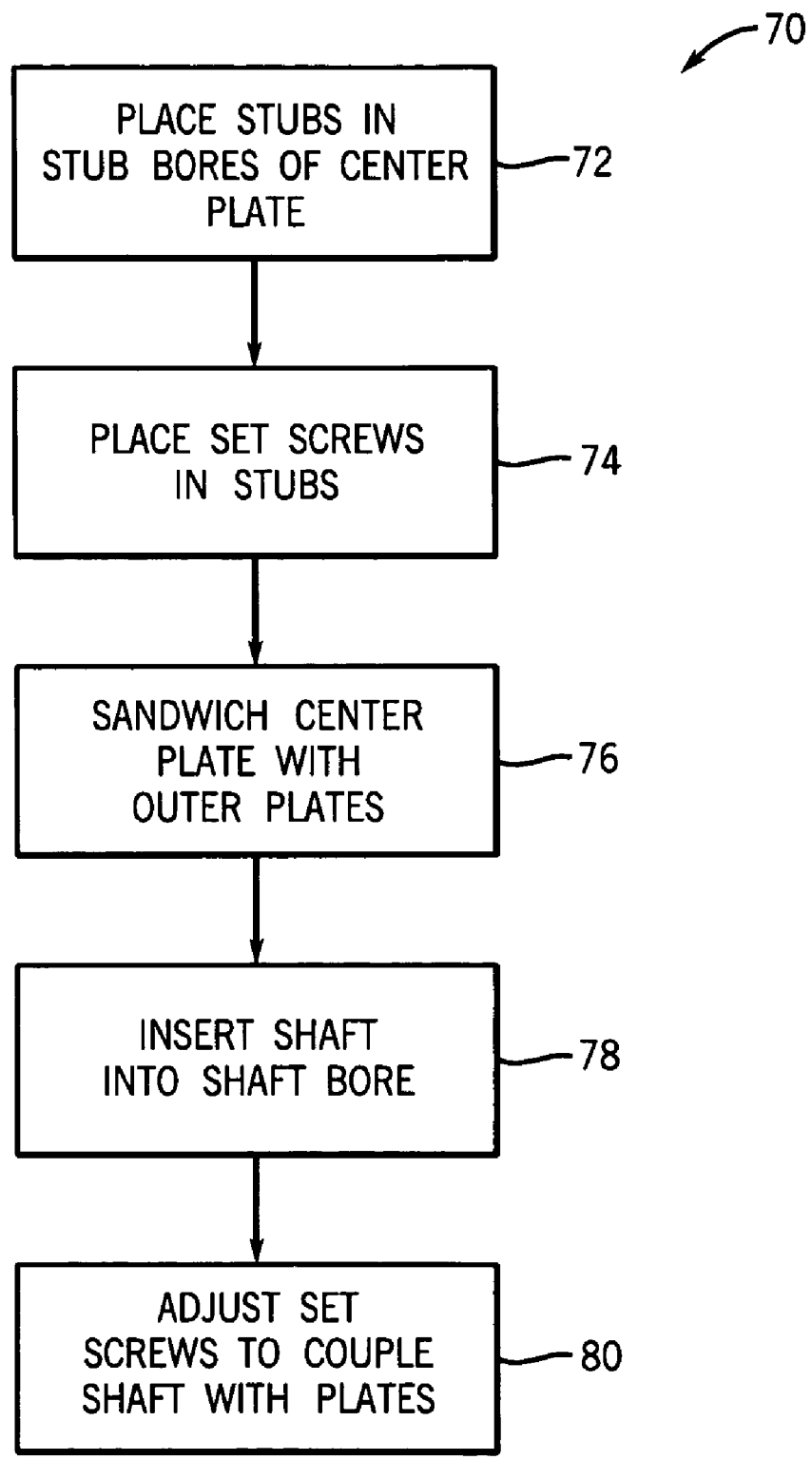
FIG. 7 is a flow chart illustrating a method of assembly for the coupling member assembly in accordance with an exemplary embodiment of the present invention.

A method for assembling the coupling member assemblies 32 and 49 is illustrated as a flow diagram in FIG. 7. Initially, as described above, the stubs 34 are placed in stub bores 28 of a center plate 22 or 50, as indicated at block 72. As discussed above, the band 36 of the stub 34 is configured to fit with narrow clearance within the stub bore 28c of the center plate 22. Additionally, the stub bore 28a-b of the outer plates 24a-b are smaller in diameter than the stub bore 28c of the center plate 22 or 50, so that when the outer plates 24a-b sandwich the center plate 22 or 50, the stubs 34 are locked in the stub bore 28. As in coupling assembly 32, the stub bores 28*a-b* in the outer plates 24 have a larger diametral clearance which allows radial displacement of stub diameter 38.

Once the stub 34 is positioned within the stub bore 28*c* of the center plate 22 or 50, the set screws 40 are inserted into the stub 34, as indicated at block 74. The outer plates 24*a-b* may then sandwich the center plate 22 or 50, as indicated at block 76. The set screws 40 may be accessed through access holes 42 which are smaller in diameter than the set screws 40 to prevent the set screws 40 from exiting the stub 34, as discussed above. Once the outer plates 24*a-c* have sandwiched the center plate 22 or 50, a shaft, such as smooth shaft 52 or geared shaft 10, for example, may be inserted into the shaft bore 26, as indicated at block 78, and a rigid friction coupling of the plates to the shaft may then be achieved by adjusting the set screws 40, as indicated at block 80.

It should be recognized that although all the foregoing examples depict a coupling assembly consisting of one center plate 22 or 50 and two outer plates 24*a-b*, any number of plates may be configured to achieve the coupling performance goals of the designer or to meet specific requirements for a particular application.

Figure 8:
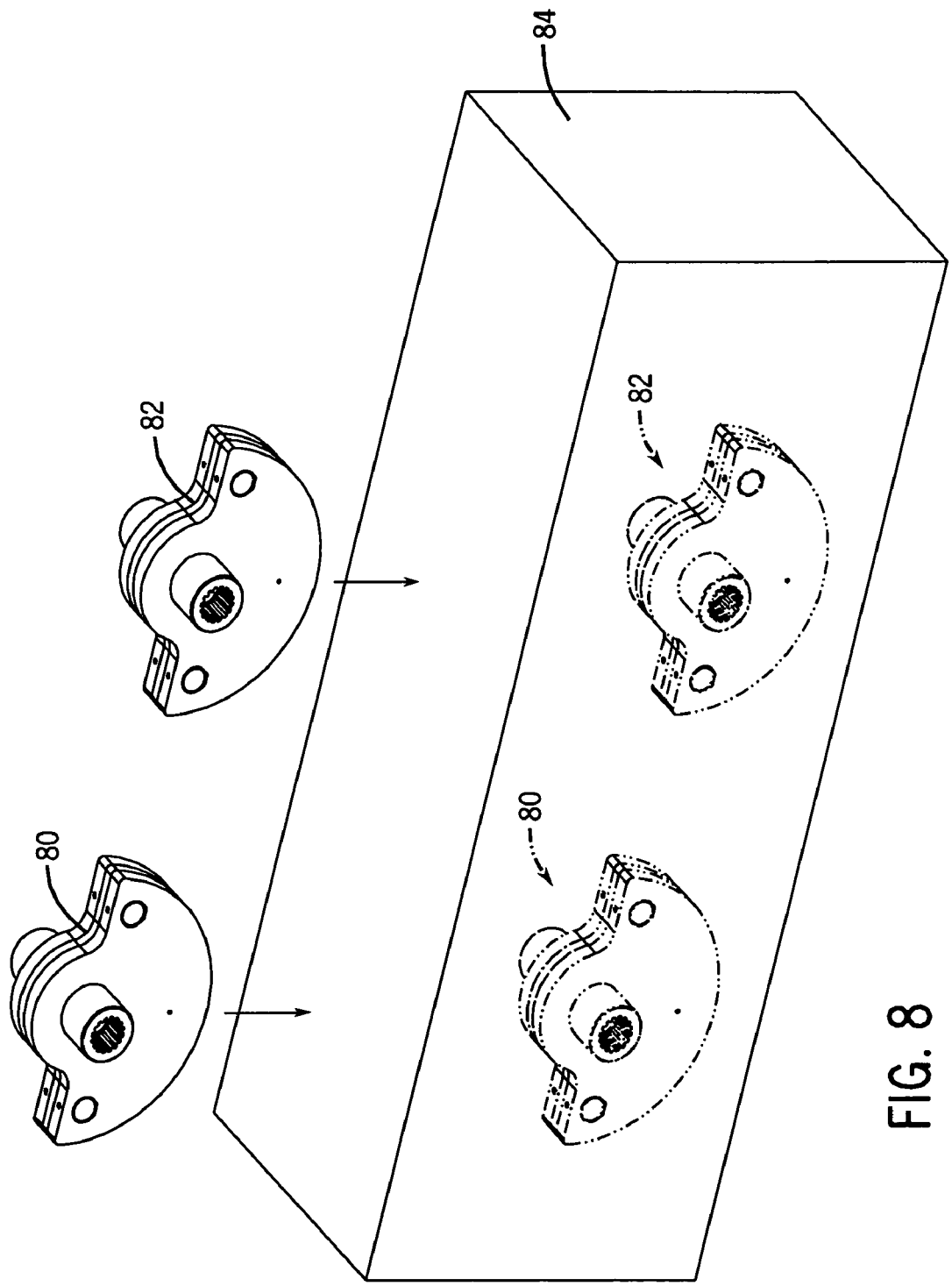
FIG. 8 illustrates insertion of the coupling member assembly into a gear box in accordance with an exemplary embodiment of the present invention.

As mentioned above, the present techniques allow for perpendicular adjustment of the set screws 40. This may be particularly advantageous if the shaft and coupling member assembly are operated in a confined space. For example, in one application, the coupling member assembly and shaft may be operated in a gear box, such as a gear box for a vibratory hammer. As illustrated in FIG. 8, a pair of coupling member assemblies 80 and 82 may be inserted into a gear box 84. The coupling member assemblies 80 and 82 may be configured to counter rotate to create vibratory forces to drive and/or withdraw piles or caissons. Because of the limited amount of space within the gear box 84, access to set screws (not shown) for adjustment of the coupling member assemblies is most convenient from a direction generally perpendicular to the shaft axis. Indeed, if the set screws 40 were oriented parallel to the longitudinal axis of the shaft, they would not be accessible without completely disassembling the gear box 84 or removing the coupling member assembly from the gear box 84.

Figure 9:
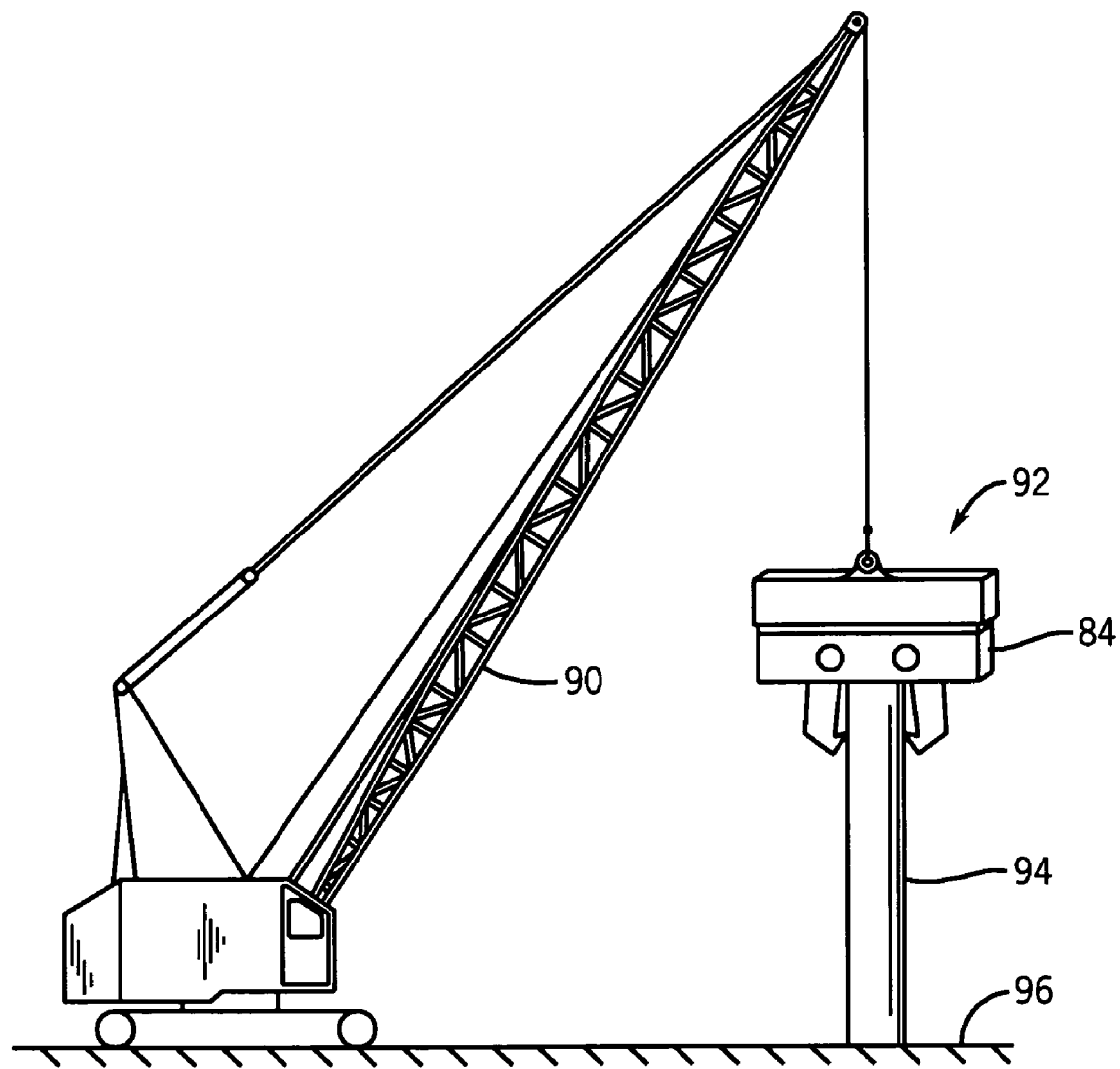
FIG. 9 illustrates a vibratory hammer system in accordance with an exemplary embodiment of the present invention.

The gear box 84 of FIG. 8 may be used in a vibratory hammer system, such as the vibratory hammer system 90 illustrated in FIG. 9, for example. The vibratory hammer system 90 may include a crane which is able to move a vibratory hammer assembly 92. The vibratory hammer assembly 92 includes the gear box 84. As mentioned above, the gear box may house a pair of coupling member assemblies 80 and 82. The coupling member assemblies in this particular application may function as eccentric weights to provide vibratory force to drive a pile 94 or caisson into the ground 96.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A friction shaft coupler comprising:
   a center plate;
   a plurality of outer plates, wherein the outer plates are configured to abut the center plate, the center plate and the plurality of outer plates each comprising:
      a shaft bore configured to receive a shaft; and
      a plurality of stub bores;
   a plurality of stubs, wherein each stub is configured to fit inside one of the plurality of stub bores, each of the plurality of stubs comprising a plurality of respective apertures that are generally perpendicular to a longitudinal axis of the stubs; and
   a plurality of threaded members configured to fit inside the apertures of the stubs, wherein the threaded members are accessible for adjustment via a plurality of respective access holes in the plurality of outer plates.

2. The friction shaft coupler of claim 1, wherein the stub bore for the center plate has a larger diameter than the stub bores for each of the plurality of outer plates.

3. The friction shaft coupler of claim 2, wherein each of the plurality of stubs comprises a center band larger than the ends of the stub, wherein the center band is configured to fit within each of the plurality of stub bores of the center plate but not in any of the plurality of stub bores of the plurality of outer plates.

4. The friction shaft coupler of claim 1, wherein the access holes have a smaller diameter than the threaded members.

5. The friction shaft coupler of claim 1, wherein each of the stub bore holes of the outer plates have a flat region, each of a plurality of set screws being configured to contact and apply pressure to a corresponding flat region when tightened.

6. The friction shaft coupler of claim 1, wherein the center plate is a geared plate.

7. The friction shaft coupler of claim 1, wherein the plurality of outer plates have a generally semi-circular shape.

8. The friction shaft coupler of claim 1, wherein the plurality of stubs and the stub bores comprise corresponding non-uniform regions configured to generally align the apertures of the stubs with the access holes of the outer plates.

9. The friction shaft coupler of claim 1, wherein each of the plurality of shaft bores is configured to allow less than $\frac{1}{1000}$ of an inch clearance for a shaft.

10. A method of manufacturing a shaft coupler comprising:
    providing a center plate, the center plate comprising:
       a shaft bore; and
       a plurality of stub bores;
    positioning stubs within the plurality of stub bores of the center plate, the stubs comprising a plurality of threaded apertures generally perpendicular to the longitudinal axis of the stubs;
    inserting threaded members into the threaded apertures of the stubs;
    positioning at least one outer plate on each side of the center plate, each outer plate comprising:
       a shaft bore;
       a plurality of stub bores, wherein the plurality of stubs are positioned within the plurality of stub bores of the outer plates; and
       a plurality of access holes configured to align with the threaded apertures of the stubs to allow access to a the threaded members; and
    tightening the threaded members within the stubs.

11. The method of claim 10, wherein providing a center plate comprises providing a geared center plate.

12. The method of claim 10, wherein positioning stubs within the plurality of stub bores comprises positioning a band protruding from each of the stubs within the respective stub bore of the center plate.

13. A vibratory hammer system comprising:
    a lifting apparatus;
    a vibratory hammer apparatus configured to be coupled to the lifting apparatus and configured to be moved by the lifting apparatus, wherein the vibratory hammer apparatus comprises:

a gear box;
a shaft supported by the gear box; and
a coupling member assembly coupled to the shaft, wherein the coupling member assembly comprises:
a plurality of plates, comprising:
a center plate;
a plurality of outer plates, wherein the outer plates are configured to abut the center plate, the center plate and the plurality of outer plates each comprising:
a shaft bore configured to receive a shaft; and
a plurality of stub bores;
wherein the plurality of plates are coupled to the shaft by tightening threaded members oriented generally perpendicular to a longitudinal axis of the shaft.

14. The vibratory hammer system of claim 13 comprising:
a plurality of stubs, wherein each stub is configured to fit inside one of the plurality of stub bores, each the plurality of stubs comprising a plurality of respective apertures that are generally perpendicular to a longitudinal axis of the stubs, wherein the threaded members fit inside the respective apertures of the stubs and are accessible for adjustment via a plurality of respective access holes in the plurality of outer plates.

15. The vibratory hammer system of claim 13, wherein the stub bore for the center plate has a larger diameter than the stub bores for each of the plurality of outer plates.

16. The vibratory hammer system of claim 13, wherein each of the plurality of stubs comprises a center band larger than the ends of the stub, wherein each center band is configured to fit within a respective stub bore of the center plate but not in the stub bores of the plurality of outer plates.

17. The vibratory hammer system of claim 14, wherein the access holes have a smaller diameter than threaded members.

18. The vibratory hammer system of claim 13, wherein the stub bore holes of the outer plates have a flat region, each set screw being configured to contact and apply pressure to a respective flat region when tightened.

19. The vibratory hammer system of claim 13, wherein the center plate is a geared plate.

* * * * *